(12) United States Patent
Achtelik et al.

(10) Patent No.: US 11,019,270 B2
(45) Date of Patent: May 25, 2021

(54) UNMANNED AERIAL VEHICLE

(71) Applicant: Intel IP Corporation, Santa Clara, CA (US)

(72) Inventors: Markus Achtelik, Woerthsee (DE); Jan Stumpf, Planegg (DE); Daniel Gurdan, Germering (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/304,175

(22) PCT Filed: Jun. 24, 2016

(86) PCT No.: PCT/US2016/039149
§ 371 (c)(1),
(2) Date: Nov. 23, 2018

(87) PCT Pub. No.: WO2017/222541
PCT Pub. Date: Dec. 28, 2017

(65) Prior Publication Data
US 2019/0349529 A1 Nov. 14, 2019

(51) Int. Cl.
*H04N 5/232* (2006.01)
*B64C 25/10* (2006.01)
(Continued)

(52) U.S. Cl.
CPC ......... *H04N 5/23299* (2018.08); *B64C 25/10* (2013.01); *F16M 11/123* (2013.01);
(Continued)

(58) Field of Classification Search
CPC .................... B64C 2201/127; B64C 39/024
See application file for complete search history.

(56) References Cited

U.S. PATENT DOCUMENTS 9,056,676 B1    6/2015  Wang
9,174,733 B1 *  11/2015 Burgess .................. B64D 1/12
(Continued)

FOREIGN PATENT DOCUMENTS

EP      2818958 A2    12/2014
WO   2015105886 A1    7/2015
(Continued)

OTHER PUBLICATIONS

International Search Report based on application No. PCT/US2016/039149 dated Dec. 16, 2016 (10 pages) (Reference Purpose Only).

*Primary Examiner* — Paulos M Natnael
(74) *Attorney, Agent, or Firm* — Viering, Jentschura & Partner MBB

(57) ABSTRACT

An unmanned aerial vehicle is described having a support frame, a sensor arrangement consisting of a sensor array including at least one sensor, the sensor array having a limited detection field of up to approximately 90 degrees. The at least one sensor is fixedly mounted to the support frame. The at least one sensor is arranged in a flight direction of the unmanned aerial vehicle. The unmanned aerial vehicle further includes a holding structure having a camera holder. The holding structure is mounted to the support frame. The holding structure is configured to provide a continuous 360 degree movement of the camera holder. The unmanned aerial vehicle further includes a first circuit configured to receive sensor data from the at least one sensor. The first circuit is further configured to determine obstacle avoidance data based on the sensor data. The unmanned aerial vehicle further includes a second circuit configured to receive image data from a camera mounted in the camera holder. The second circuit is further configured to determine holding structure control data to control movement of the holding structure based on the image data.

20 Claims, 5 Drawing Sheets

(51) Int. Cl.
  *H04N 5/225*      (2006.01)
  *B64C 39/02*      (2006.01)
  *F16M 11/12*      (2006.01)
  *G05D 1/00*       (2006.01)

(52) U.S. Cl.
  CPC ......... *G05D 1/0094* (2013.01); *H04N 5/2253* (2013.01); *B64C 39/024* (2013.01); *B64C 2201/042* (2013.01); *B64C 2201/108* (2013.01); *B64C 2201/127* (2013.01); *B64C 2201/141* (2013.01)

(56) References Cited

U.S. PATENT DOCUMENTS

| | | | |
|---|---|---|---|
| 10,184,795 B2* | 1/2019 | Song | G01C 19/00 |
| 10,577,081 B2* | 3/2020 | Baca | G08G 5/0091 |
| 2016/0070265 A1* | 3/2016 | Liu | G01C 21/00 |
| | | | 701/3 |
| 2016/0076892 A1* | 3/2016 | Zhou | B64C 39/024 |
| | | | 701/3 |
| 2018/0290748 A1* | 10/2018 | Corban | B64C 39/024 |
| 2018/0327091 A1* | 11/2018 | Burks | B64C 39/024 |
| 2019/0187711 A1* | 6/2019 | Xie | B64C 39/024 |
| 2019/0349529 A1* | 11/2019 | Achtelik | B64C 25/10 |

FOREIGN PATENT DOCUMENTS

| | | |
|---|---|---|
| WO | 2016026128 A1 | 2/2016 |
| WO | 2016029469 A1 | 3/2016 |

\* cited by examiner

UNMANNED AERIAL VEHICLE

RELATED APPLICATIONS

The present application is a national stage application of International Patent Application No.: PCT/US2016/039149 filed on Jun. 24, 2016 and is incorporated herein by reference in its entirety.

TECHNICAL FIELD

Various aspects of this disclosure generally relate to an unmanned aerial vehicle.

BACKGROUND

A conventional unmanned aerial vehicle (UAV) has a plurality of sensors for 360 degree obstacle detection. The sensors are arranged circumferentially along the housing of the UAV. The sensors have a limited detection angle of e.g. 60 degrees. Therefore, usually six sensors are provided to detect the 360 degree environment of the UAV during operation in order provide a complete obstacle detection. However, the sensors are rather costly and a high number of sensors increases the probability of failure of one or more of the sensors with the consequence that the complete obstacle detection may no longer be guaranteed. Furthermore, conventional UAVs have a camera to track a predefined target.

BRIEF DESCRIPTION OF THE DRAWINGS

The disclosure is explained in greater detail below on the basis of exemplary embodiments, wherein also as before no distinction will be drawn specifically among the claim categories and the features in the context of the independent claims are intended also to be disclosed in other combinations. In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

DETAILED DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

An unmanned aerial vehicle (UAV) is an aircraft that has the capability of autonomous flight. In autonomous flight, a human pilot is not aboard and in control of the UAV. The UAV may also be denoted as unstaffed, uninhabited or unpiloted aerial-vehicle, -aircraft or -aircraft system or drone.

The UAV, according to various aspects, includes a holding structure having a camera holder. The holding structure may be a camera gimbal. The holding structure, e.g. the gimbal, has an independent continuous 360 degree movement to track a target, e.g. a person or point of interest, with a tracking camera while the amount of sensors provided for the obstacle detection and fixedly mounted on a support frame of the UAV may be reduced to only one sensor in a direction of flight of the aircraft. By using only exactly one sensor, which is fixedly mounted such that the main axis of the detection angle is the x-axis of the aircraft, i.e. the flight direction of the aircraft, it is always ensured that the obstacle detection properly works in the (present and intended) flight direction of the UAV. The movement of the tracking camera is independent from the obstacle detection sensor. Furthermore, the tracking camera has a continuous 360 degree movement capability since it is mounted on a continuous 360 degree gimbal.

Thus, the costs for the aircraft are reduced and at the same time, the reliability of the sensor system is also improved. Furthermore, the tracking camera has a 360 degree visual field. In addition, energy required for operating the common sensors for 360 degree obstacle detection may be saved and, thus, flight time may increase.

In general, the described UAV can be in the shape of a plane (fixed wing) or a copter (multi rotor), i.e. a rotorcraft UAV, e.g. a quad-rotor, a hex-rotor, an octo-rotor.

The UAV may operate with various degrees of autonomy: under remote control by a human operator, or fully or intermittently autonomously, by onboard computers. The UAV can take-off and land without control in take-off or landing mode. Alternatively, the UAV is controlled manually by Radio Control (RC) at take-off and landing. The UAV may switch into a GPS-guided autonomous mode at a safe altitude. In another mode or design, the UAV is controlled manually by RC during flight, e.g. temporarily.

Figure 1:
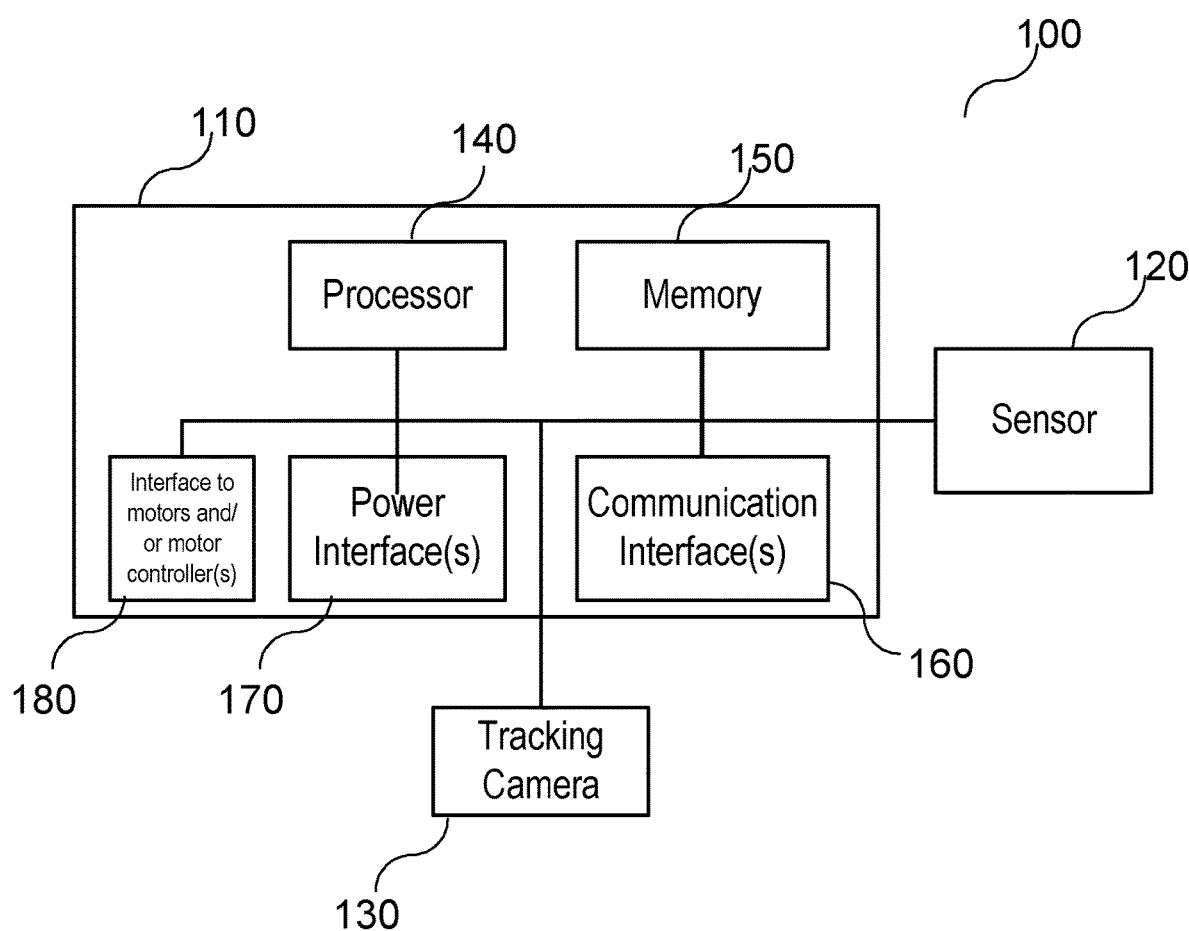
FIG. 1 shows a block diagram illustrating the electronic circuits provided in the unmanned aerial vehicle.

FIG. 1 shows a block diagram illustrating the electronic circuits provided in the unmanned aerial vehicle (UAV) 100. The UAV 100 may include at least a flight controller 110, a sensor arrangement 120 and a tracking camera 130. The sensor arrangement may be formed by or consist of a sensor array which may include at least one sensor. The tracking camera 130 may also be denoted as a camera 130.

The UAV 100 further includes a support frame. Components of the UAV may be mounted on the support frame. The UAV 100 is further configured to carry a payload, e.g. a camera gimbal and a camera, as described in more detail below.

The flight controller 110 includes a processor 140, a memory 150, one or more communication interface(s) 160, one or more power interface(s) 170 and one or more interface(s) 180 to one or more motor(s) and/or motor controller(s). Some or all of the electronic circuits and/or interface(s) may be arranged on one or more printed circuit boards (PCBs).

The processor 140 may be implemented by any kind of one or more logic circuits.

The memory 150 may be implemented by any kind of one or more electronic storing entities, e.g. a semiconductor memory or a computer data storage, e.g. a RAM, a SD card or a SSD memory.

The one or more communication interface(s) 160 may be one or more wireline or wireless communication interfaces. A communication interface may include a transceiver circuit configured to provide an uplink transmission and/or downlink reception of radio signals including data, e.g. video or image data and/or commands. The transceiver circuit may include a radio frequency (RF) transmitter and/or a radio frequency (RF) receiver.

The one or more power interface(s) 170 may be one or more wireline or wireless power supply interfaces.

Further, the UAV 100 includes at least one power supply that is electrically connected to the power interface(s) 170. At least one battery may be part of the power supply. The battery may be or include one or more batteries such as e.g. one or more lithium-polymer batteries (Li—Po). The battery/batteries may be exchangeable, e.g. in order to charge the respective battery/batteries.

The flight controller 110 may further include a power interface to supply power to a camera 130 mounted in a camera holder.

The UAV 100 may further have a battery elimination circuitry (BEC). The BEC may centralize power distribution. The BEC may include a microcontroller unit (MCU). The BEC may be a switching BEC. Thus, heat on the UAV 100 may be diminished.

The flight controller 110 may further include an inertial measurement unit (IMU) circuit and a compass circuit.

The IMU allows a calibration of the UAV 100 regarding a predefined plane in a coordinate system. The IMU allows to determine the roll and pitch angle of the UAV with respect to the gravity vector (e.g. from planet earth). Thus, an orientation of the UAV 100 in a coordinate system may be determined. The orientation of the UAV may be calibrated using the IMU before the UAV 100 is operated.

The compass circuit may include a global positioning circuit (GPS) for determining the position of the UAV in a coordinate system, e.g. a coordinate system of the sensor 120. If a compass circuit is available, it also allows to determine the absolute yaw (or heading) angle of the UAV 100.

The sensor arrangement 120 is at least one obstacle detection sensor (e.g. a 3D camera sensor) and detects obstacles in a coordinate system of the respective sensor.

The sensor arrangement 120 may be formed of or may consist of a sensor array having at least one sensor. The sensor array has a limited detection field, e.g. of up to approximately 90 degrees (e.g. up to approximately 60 degrees). The at least one sensor is fixedly mounted to the support frame. The at least one sensor is arranged in a flight direction of the unmanned aerial vehicle. The detection field may be a visual field, e.g. in case of an optical sensor array.

By way of example, the sensor arrangement is an optical sensor arrangement that may be formed of or may consist of an optical sensor array having at least one optical sensor.

The angular range of the detection field, e.g. up to 90 degrees, may be related to a predefined plane. The predefined plane, as example, may be a plane having an angle with the main axis of the flight direction (e.g. x-axis), the angle with the main axis may be in a range of up to (±) 90 degrees to the flight direction (e.g. x-axis), wherein 0 degrees denotes that the detection field is in plane or about in plane with the flight direction. In other words: the given angle of the detection field, e.g. up to 90 degrees, may be an angle of a solid angle of the detection field in a spherical coordinate system. The solid angle of the detection field may be arranged or aligned in an angle regarding the flight direction.

Thus, the sensor 120 generates detection signals and forwards them to the memory 150. The processor 140 retrieves the detection signals from the memory 150 and processes them to provide obstacle detection. Based on the state information (position, orientation) from the flight controller 110, the coordinates of the obstacles are transformed into a fixed coordinate system, in which the collision avoidance (CA) algorithm creates a map of obstacles. From this map of obstacles, the CA algorithm computes a feasible, collision free, path for the UAV 100.

In order to deal with the limited field of view (FOV) of the obstacle detection sensors 120, the CA algorithm chooses the orientation of the UAV always in a way, such that the direction of flight always lies within the FOV of the obstacle detection sensors 120.

In case of a sudden change of the direction of flight, computed by the CA algorithm, the CA algorithm slows down the forward speed first, until the UAV has turned the obstacle detection sensors into the new direction of flight.

The tracking camera 130 generates image and/or video signals and transmits the same to the memory 150. The processor retrieves the image and/or video signals of the tracking camera 130 from the memory 150 and processes the same to provide a target tracking, as described in more detail below. A target may be, e.g. a person or point of interest that may be stationary or mobile.

Tracking the target can be achieved in many ways. However, the target tracking method provides the angle, and optionally the distance, of the target relative to the UAVs 100 coordinate frame.

As an example method for target tracking, a GPS signal from a receiver on the UAV as well as a GPS receiver on a target to be tracked, can be used to provide this information.

Further, the processor 140 generates gimbal control signals to control the movement of the gimbal. That is, the flight controller 110 includes at least a sensor and obstacle avoidance (SOA) circuit (also denoted as first circuit) and an image data and gimbal control (IDGC) circuit (also denoted as second circuit). The SOA circuit and the IDGC circuit may be implemented by use of the described components of the flight controller 110. The SOA circuit and the IDGC circuit may be implemented in a single circuit.

The SOA circuit may be configured to receive sensor data from the at least one sensor of the sensor array of the sensor arrangement 120 of the UAV 100. The SOA circuit is further configured to determine obstacle avoidance data based on the sensor data.

The IDGC circuit is configured to receive image data from the camera 130 mounted in a camera holder that is mounted in a camera gimbal. The IDGC circuit is further configured to determine camera gimbal control data to control movement of the camera gimbal based on the image data.

The UAV may further include at least one non-optical sensor. The at least one non-optical sensor may be fixedly mounted to the support frame.

Further, the SOA circuit may be configured to receive non-optical sensor data from the at least one non-optical sensor. The SOA circuit may be further configured to determine obstacle avoidance data based on the optical and non-optical sensor data.

Figure 2A:
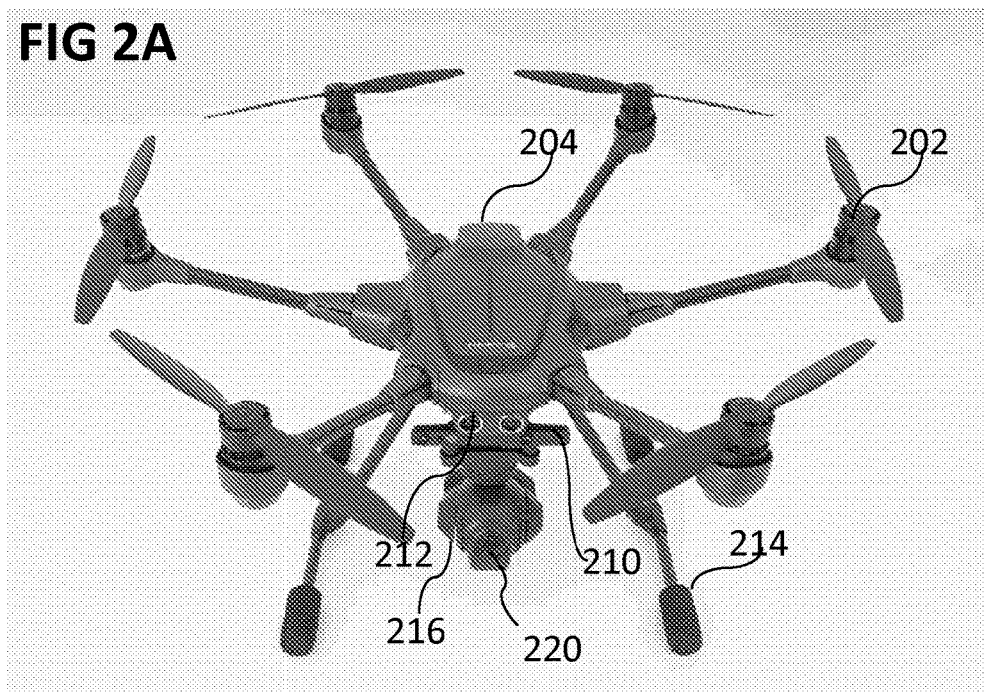
FIGS. 2A-2C show images of an example of an unmanned aerial vehicle.
Figure 2B:
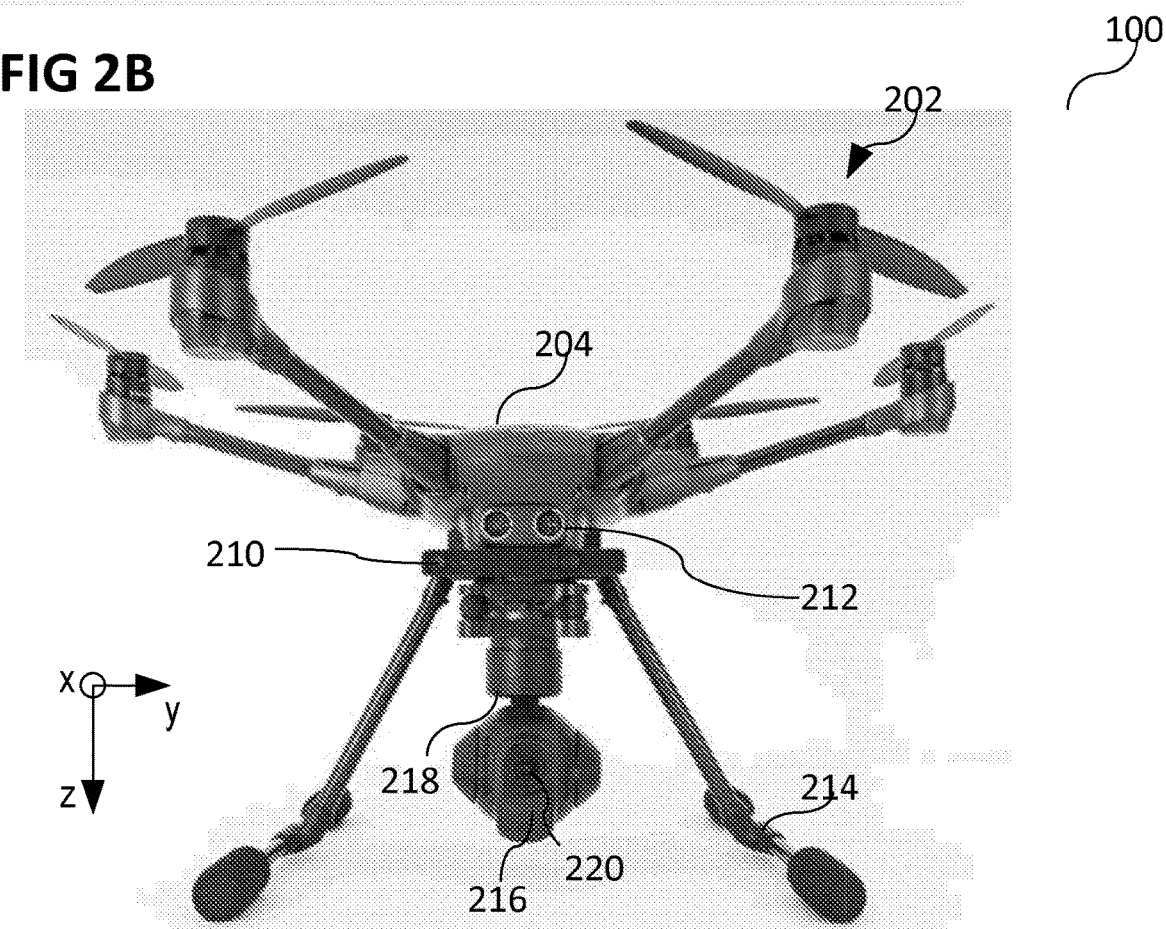
Figure 2C:
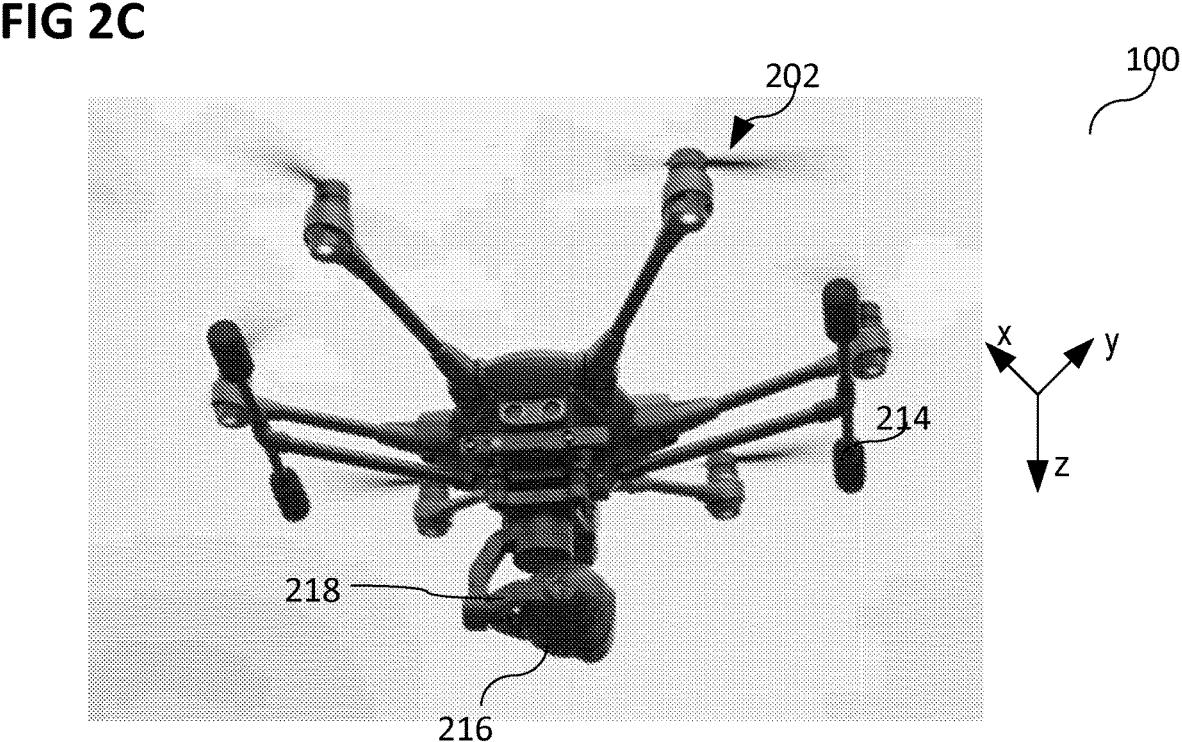

FIGS. 2A-C show images of an UAV 100 as described above. FIG. 2A shows a top-front view of the UAV 100. FIG. 2B shows a detailed front view on the UAV 100. FIG. 2C shows the UAV 100 during flight operation.

The support frame may include a plurality of tubes, e.g. a plurality of metal tubes (at least some of them may be hollow tubes). A housing 204 is mounted on the support frame. The housing 204 may accommodate one or more batteries of the power supply and one or more electronic circuits of the flight controller to control the UAV 100.

Moreover, one or more motors with respectively coupled rotors 202 is/are mounted on the support frame, e.g. one, two, four, six or eight motors.

As also shown in FIGS. 2A-C, a sensor arrangement including a sensor array 210 formed by e.g. exactly one sensor 210 is mounted on the support frame. The sensor array is fixedly aligned with the main axis of the detection angle that is the x-axis of the UAV, i.e. the flight direction of the UAV. The sensor arrangement may, in addition, include a sonar 212.

The sensor array has a detection field of about 60 to about 90 degrees and thus can detect the environment in the range from about (±) 30 degrees to about (±) 45 degrees from the flight direction of the UAV 100. The sensor array may be fixedly aligned with a main axis of a detection angle, e.g. the sensor array is fixedly aligned with a main axis of the detection field. The sensor is fixed (cannot be moved) relative to the support frame. The detection field may be a visible field.

The sensor array may include a plurality of sensors, however, the entirety of sensors in the sensor array only covers a limited detection field of about (±) 30 degrees to about (±) 45 degrees from the flight direction of the UAV, that is detection field having a range of about (±) 30 degrees or about (±) 45 degrees around the flight direction of the UAV.

In one example, the sensor array 210 includes exactly one sensor 210. The one sensor 210 is fixedly mounted to the support frame. That is, the one sensor is fixed in its position and orientation relative to the support frame. The one sensor may be arranged, e.g. positioned and oriented, in a flight direction of the UAV 100. The sensor 210 may be fixedly mounted such that a main axis of a detection angle is a flight direction of the UAV, e.g. the one sensor is fixedly mounted such that a main axis of the detection field is a flight direction of the UAV 100. In other words, the detection field, e.g. the detection field, of the one sensor is substantially in a flight direction of the UAV 100.

The one sensor may be an optical sensor, a sonar that is an ultrasonic sensor, or a radar. The one sensor may be configured to retrieve a distance from the UAV 100 to an obstacle. The sensor 210 may be an Intel® RealSense™ sensor.

The camera gimbal 218 is mounted to the support frame. The camera gimbal 218 includes a camera holder 216. The gimbal 218 is configured to provide a free continuous 360 degree movement of the camera holder 216 around the z-axis of the UAV 100. The z-axis has at least a component perpendicular to the x-axis and the gimbal 218 may extend along the z-axis. The z-axis may not be perpendicular to x-axis and/or y-axis. The movement of the camera holder 216 is independent from the detection angle or field of view of the sensor array 210.

In addition, the gimbal 218 may be configured to provide a multiple of the continuous 360 degree movement, e.g. 540 degrees, 720 degrees or even unlimited continuously adjustable rotation. In other words, the gimbal may rotate without stop, e.g. by means of a ball bearing.

The gimbal 218 may be a two axis gimbal. Alternatively, the gimbal is a three axis gimbal. This way, the gimbal may soften up jitters of the support frame. In addition, yaw of the camera tracking may be smoothed by the three axis gimbal. The movement of the gimbal 218 may be locked in a determinable position.

The UAV 100 may further include a camera 220. The camera 220 is mounted in the camera holder 216 of the camera gimbal 218. The camera 220 may be a tracking camera 220. The camera 220 may be completely independent from the sensor array 210, e.g. the camera 220 movement of the tracking camera 220 may be independent from obstacle avoidance data. Thus, the tracking camera 220 can be rotated via the gimbal 218 freely and continuously 360 degree around the z-axis of the UAV 100. Illustratively, the tracking camera is completely independent from the sensor 210. Thus, the tracking camera 220 can track a target or POI independently from the sensor 210.

The UAV 100 may further include an integrated landing gear 214. The landing gear 214 may be retractable. In FIG. 2C, the UAV 100 is shown in flight operation with a retracted landing gear 214. This way, an unobstructed view for the camera 220 is enabled in the continuous 360 degree movement of the camera holder 216 of the gimbal 218.

Figure 3A:
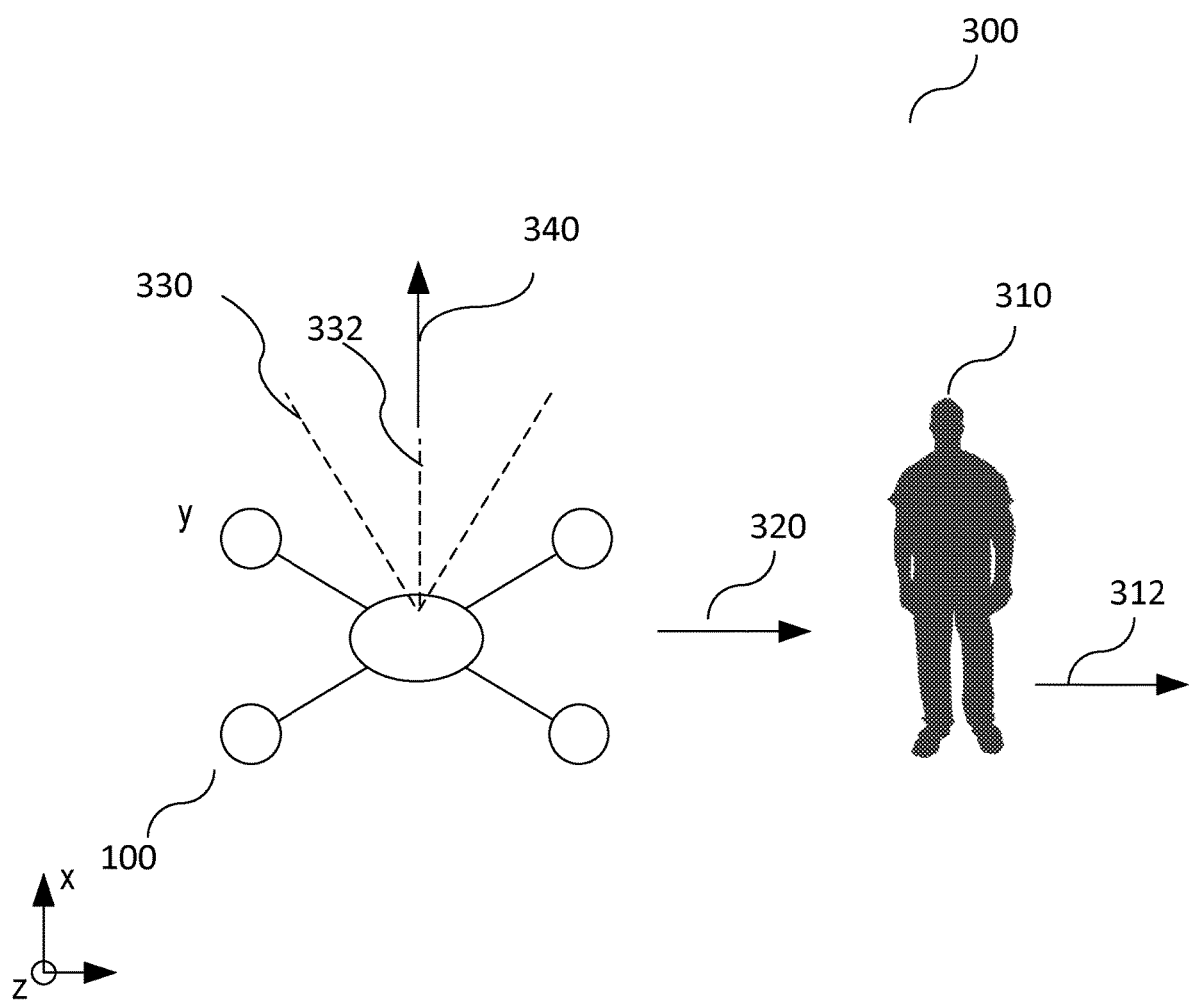
FIGS. 3A-3B show schematic diagrams illustrating a camera flight tracking mode of an unmanned aerial vehicle.
Figure 3B:
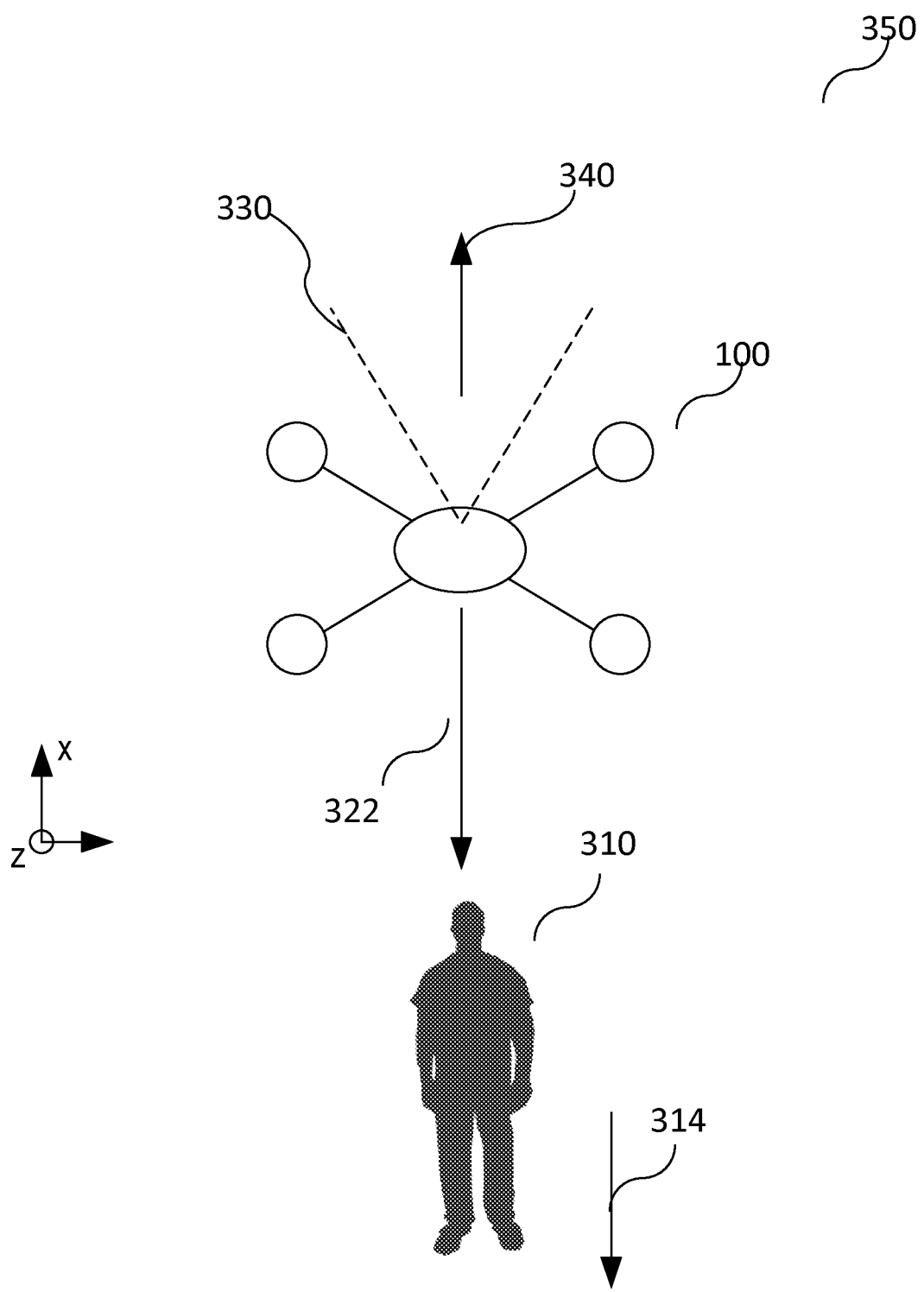

FIG. 3A-B show schematic diagrams illustrating a camera flight tracking mode of the UAV described above.

As shown in FIG. 3A, the UAV 100 flies in flight direction 340 and the POI 310 moves, e.g. is walking, along a direction 312 perpendicular to the flight direction 340. The target camera is rotated by 90 degrees relative to the flight direction and is tracking 320 a relative movement of the POI 310. In tracking the relative movement the movement of the POI 310 and the movement of the UAV 100 are considered in the movement of the gimbal and/or camera holder so as to keep the POI 310 within the focus of the camera mounted in the camera holder of the UAV 100.

The movement of the POI 310 is a relative movement of the POI 310 regarding the UAV 100. That is, the UAV 100 may fly and the POI 310 is immobile or the UAV 100 flies and the POI 310 moves.

Obstacle detection or a flight direction 340 may also be applicable when the UAV 100 is hovering, that is to remain in a predefined position in a coordinate system. Hence, the camera of the UAV 100 may operate independent from the sensor and/or an actual move of the UAV 100. The camera in the gimbal may, however, be moved in tracking the POI 310.

Further shown in FIG. 3A, B, the main axis 332 of a detection angle 330 is the flight direction 340 of the UAV 100, e.g. the one sensor is fixedly mounted such that a main axis of the detection field is a flight direction of the UAV 100. In other words, the detection field 330, e.g. the visual field 330, of the one sensor is substantially in a flight direction 340 of the UAV 100.

As shown in FIG. 3B, the UAV 100 flies in flight direction 340 and the POI moves, e.g. is walking, along a direction 314 opposite to the flight direction 340. The target camera is rotated by 180 degrees relative to the flight direction 340 and is tracking 322 the relative movement of the POI 310.

In addition, the UAV 100 may fly ahead of the POI 310, e.g. in a predetermined distance. Alternatively, the UAV 100 may follow the POI 310, e.g. in a predetermined distance. Further, the flight controller may estimate the moving vector of the POI and amend the path of the UAV based on the moving vector and the detected obstacles. This way, the deviation of the actual distance between the UAV 100 to the POI 310 from the predetermined distance may be reduced. Thus, the amount of movement of the gimbal and/or the camera holder and, thus, the amount of energy to move the gimbal and/or the camera holder may be reduced.

In addition, the UAV 100 and the POI 310 may move in various different directions and, thus, requiring a complex movement of the camera to track the POI 310. The complex movement of the camera may be a movement relative to the flight direction 340. The complex movement may be, as example, a sequence of a vertical, a parallel and/or a perpendicular movement of the camera.

Example 1, as described with reference to FIGS. 1A to 3B, is an unmanned aerial vehicle, comprising a support frame, a sensor arrangement consisting of a sensor array comprising at least one sensor, the sensor array having a limited detection field of up to approximately 90 degrees, wherein the at least one sensor is fixedly mounted to the support frame, wherein the at least one sensor is arranged in a flight direction of the unmanned aerial vehicle, a holding structure having a camera holder, the holding structure mounted to the support frame, wherein the holding structure is configured to provide a continuous 360 degree movement of the camera holder, a first circuit configured to receive sensor data from the at least one sensor, wherein the first circuit is further configured to determine obstacle avoidance data based on the sensor data, and a second circuit configured to receive image data from a camera mounted in the camera holder, wherein the second circuit is further configured to determine holding structure control data to control movement of the holding structure based on the image data.

In Example 2, the subject matter of Example 1 can optionally include that the holding structure includes a camera gimbal. The camera gimbal is mounted to the support frame. The camera gimbal includes the camera holder. The gimbal is configured to provide a continuous 360 degree movement of the camera holder. Further, the camera holder control data are camera gimbal control data.

In Example 3, the unmanned aerial vehicle of Example 1 or 2 can optionally be configured as a rotorcraft unmanned aerial vehicle.

In Example 4, the subject matter of any one of Examples 1-3 can optionally include that the sensor array includes exactly one sensor.

In Example 5, the subject matter of any one of Examples 1-4 can optionally include that the sensor array includes at least one optical sensor, sonar or radar.

In Example 6, the subject matter of Example 4 can optionally include that the one sensor is an optical sensor, a sonar that is an ultrasonic sensor, or a radar.

In Example 7, the subject matter of Example 4-6 can optionally include that the one sensor is configured to retrieve a distance from the unmanned aerial vehicle to an obstacle.

In Example 8, the subject matter of Example 4-7 can optionally include that the one sensor is fixed in its position and orientation relative to the support frame.

In Example 9, the subject matter of Example 4-8 can optionally include that the one sensor is fixedly mounted such that a main axis of a detection angle is a flight direction of the unmanned aerial vehicle.

In Example 10, the subject matter of Example 4-9 can optionally include that the one sensor is fixedly mounted such that a main axis of the detection field is a flight direction of the unmanned aerial vehicle.

In Example 11, the subject matter of Example 1-10 can optionally include that the sensor array is fixedly aligned with a main axis of a detection angle.

In Example 12, the subject matter of Example 1-11 can optionally include that the sensor array is fixedly aligned with a main axis of the detection field.

In Example 13, the subject matter of Example 1-12 can optionally include that the sensor array has a detection field of about 60 degrees to about 90 degrees.

In Example 14, the subject matter of Example 1-13 can optionally include that the sensor array can optionally include a plurality of sensors, wherein the entirety of sensors in the sensor array only covers a limited detection field of about (±) 30 or about (±) 45 degrees from the flight direction of the unmanned aerial vehicle.

In Example 15, the subject matter of Example 1-14 can optionally include that the sensor array can optionally include a plurality of sensors, wherein the entirety of sensors in the sensor array only covers a limited detection field of about (±) 30 or about (±) 45 degrees from the flight direction of the unmanned aerial vehicle.

In Example 16, the subject matter of Example 1-15, the unmanned aerial vehicle can further optionally include a camera that is mounted in the camera holder.

In Example 17, the subject matter of Example 16 can optionally include that the camera is a tracking camera.

In Example 18, the subject matter of Example 16-17 can optionally include that the camera is completely independent from the sensor array.

In Example 19, the subject matter of Example 17 or 18 can optionally include that the camera movement of the tracking camera is independent from the obstacle avoidance data.

In Example 20, the subject matter of Example 1-19, the unmanned aerial vehicle can further optionally include a power interface to supply power to a camera mounted in the camera holder.

In Example 21, the subject matter of Example 1-20 can optionally include that the holding structure, e.g. the camera gimbal, is configured to provide a multiple of the continuous 360 degree movement.

In Example 22, the subject matter of Example 2-21 can optionally include that the gimbal is a two axis gimbal.

In Example 23, the subject matter of Example 2-22 can optionally include that the gimbal is a three axis gimbal.

In Example 24, the subject matter of Example 2-23 can optionally include that the gimbal is configured to be locked in its movement in a determinable position.

In Example 25, the subject matter of Example 1-24, the unmanned aerial vehicle can further optionally include an integrated landing gear, wherein the landing gear may be retractable enabling an unobstructed view for a camera in the continuous 360 degree movement of the camera holder.

In Example 26, the subject matter of Example 1-25 can optionally include that the first circuit and the second circuit are integrated in a single circuit.

Example 27, as described with reference to FIGS. 1A to 3B, is an unmanned aerial vehicle, comprising a support frame, an optical sensor arrangement consisting of a optical sensor array comprising at least one optical sensor, the optical sensor array having a limited detection field of up to approximately 90 degrees, wherein the at least one optical sensor is fixedly mounted to the support frame, wherein the at least one optical sensor is arranged in a flight direction of the unmanned aerial vehicle, a holding structure having a camera holder, the holding structure mounted to the support frame, wherein the holding structure is configured to provide a continuous 360 degree movement of the camera holder, a first circuit configured to receive optical sensor data from the at least one optical sensor, wherein the first circuit is further configured to determine obstacle avoidance data based on the optical sensor data, and a second circuit configured to receive image data from a camera mounted in the camera holder, wherein the second circuit is further configured to determine holding structure control data to control movement of the holding structure based on the image data.

In Example 28, the subject matter of Example 27 can optionally include that the holding structure includes a camera gimbal. The camera gimbal is mounted to the support frame. The camera gimbal includes the camera holder. The gimbal is configured to provide a continuous 360 degree movement of the camera holder. Further, the camera holder control data are camera gimbal control data.

In Example 29, the unmanned aerial vehicle of Example 27 or 28 can optionally be configured as a rotorcraft unmanned aerial vehicle.

In Example 30, the subject matter of any one of Examples 27-29 can optionally include that the optical sensor array includes exactly one optical sensor.

In Example 31, the subject matter of Example 27-30 can optionally include that the one optical sensor is configured to retrieve a distance from the unmanned aerial vehicle to an obstacle.

In Example 32, the subject matter of Example 27-31 can optionally include that the optical sensor array is fixedly aligned with a main axis of a detection angle.

In Example 33, the subject matter of Example 27-32 can optionally include that the optical sensor array has a detection field of about 60 degrees to about 90 degrees.

In Example 34, the subject matter of Example 27-29 or 31-33 can optionally include that the optical sensor array can optionally include a plurality of optical sensors, wherein the entirety of optical sensors in the optical sensor array only covers a limited detection field of about (±) 30 or about (±) 45 degrees from the flight direction of the unmanned aerial vehicle.

In Example 35, the subject matter of Example 27-34, the unmanned aerial vehicle can further optionally include a camera that is mounted in the camera holder.

In Example 36, the subject matter of Example 35 can optionally include that the camera is a tracking camera.

In Example 37, the subject matter of Example 35 or 36 can optionally include that the camera is completely independent from the optical sensor array.

In Example 38, the subject matter of Example 36 or 37 can optionally include that the camera movement of the tracking camera is independent from the obstacle avoidance data.

In Example 39, the subject matter of Example 27-38, the unmanned aerial vehicle can further optionally include a power interface to supply power to a camera mounted in the camera holder.

In Example 40, the subject matter of Example 27-39 can optionally include that the holding structure, e.g. the camera gimbal, is configured to provide a multiple of the continuous 360 degree movement.

In Example 41, the subject matter of Example 28-40 can optionally include that the gimbal is a two axis gimbal.

In Example 42, the subject matter of Example 28-41 can optionally include that the gimbal is a three axis gimbal.

In Example 43, the subject matter of Example 28-42 can optionally include that the gimbal is configured to be locked in its movement in a determinable position.

In Example 44, the subject matter of Example 27-43, the unmanned aerial vehicle can further optionally include an integrated landing gear, wherein the landing gear may be retractable enabling an unobstructed view for a camera in the continuous 360 degree movement of the camera holder.

In Example 45, the subject matter of Example 27-44 can optionally include that the first circuit and the second circuit are integrated in a single circuit.

In Example 46, the subject matter of Example 27-45 can optionally include that the first circuit is further configured to determine obstacle avoidance data based on the optical and non-optical sensor data.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. An unmanned aerial vehicle, comprising:
a support frame;
a sensor arrangement consisting of a sensor array comprising at least one sensor, the sensor array having a limited detection field of up to approximately 90 degrees, wherein the at least one sensor is fixedly mounted to the support frame, wherein the at least one sensor is arranged in a flight direction of the unmanned aerial vehicle;
a holding structure having a camera holder, the holding structure mounted to the support frame, wherein the holding structure is configured to provide a continuous 360 degree movement of the camera holder;
a first circuit configured to receive sensor data from the at least one sensor, wherein the first circuit is further configured to determine obstacle avoidance data based on the sensor data; and
a second circuit configured to receive image data from a camera mounted in the camera holder, wherein the second circuit is further configured to determine camera holder control data to control movement of the camera holder based on the image data.

2. The unmanned aerial vehicle of claim 1,
wherein the holding structure comprises a camera gimbal, wherein the camera gimbal is mounted to the support frame, wherein the camera gimbal comprises the camera holder and wherein the gimbal is configured to provide a continuous 360 degree movement of the camera holder and wherein the camera holder control data are camera gimbal control data.

3. The unmanned aerial vehicle of claim 2,
wherein the sensor array comprises a plurality of sensors, wherein the entirety of sensors in the sensor array only covers a limited detection field of about (±) 30 or about (±) 45 degrees from the flight direction of the unmanned aerial vehicle.

4. The unmanned aerial vehicle of claim 2,
wherein the gimbal is a two axis gimbal.

5. The unmanned aerial vehicle of claim 2,
wherein the gimbal is a three axis gimbal.

6. The unmanned aerial vehicle of claim 1,
wherein the unmanned aerial vehicle is configured as a rotorcraft unmanned aerial vehicle.

7. The unmanned aerial vehicle of claim 1,
wherein the sensor array comprises exactly one sensor.

8. The unmanned aerial vehicle of claim 7,
wherein the one sensor is configured to retrieve a distance from the unmanned aerial vehicle to an obstacle.

9. The unmanned aerial vehicle of claim 7,
wherein the one sensor is fixedly mounted such that a main axis of a detection angle is a flight direction of the unmanned aerial vehicle.

10. The unmanned aerial vehicle of claim 1,
wherein the sensor array has a detection field of about 60 degrees to about 90 degrees.

11. The unmanned aerial vehicle of claim 1,
wherein the sensor array comprises a plurality of sensors, wherein the entirety of sensors in the sensor array only covers a limited detection field of about (±) 30 or about (±) 45 degrees from the flight direction of the unmanned aerial vehicle.

12. The unmanned aerial vehicle of claim 1, further comprising
a camera that is mounted in the camera holder.

13. The unmanned aerial vehicle of claim 12,
wherein the camera is a tracking camera.

14. The unmanned aerial vehicle of claim 13,
wherein the camera movement of the tracking camera is independent from the obstacle avoidance data.

15. The unmanned aerial vehicle of claim 12,
wherein the camera is completely independent from the sensor array.

16. The unmanned aerial vehicle of claim 1, further comprising:
a power interface to supply power to a camera mounted in the camera holder.

17. The unmanned aerial vehicle of claim 1,
wherein the holding structure is configured to provide a multiple of the continuous 360 degree movement.

18. The unmanned aerial vehicle of claim 1, further comprising:
an integrated landing gear wherein the landing gear may be retractable enabling an unobstructed view for a camera in the continuous 360 degree movement of the camera holder.

19. An unmanned aerial vehicle, comprising:
a support frame;
an optical sensor arrangement consisting of an optical sensor array comprising at least one optical sensor, the optical sensor array having a limited detection field of up to approximately 90 degrees, wherein the at least one optical sensor is fixedly mounted to the support frame,
wherein the at least one optical sensor is arranged in a flight direction of the unmanned aerial vehicle;
a holding structure having a camera holder, the holding structure mounted to the support frame, wherein the holding structure is configured to provide a continuous 360 degree movement of the camera holder;
a first circuit configured to receive optical sensor data from the at least one optical sensor, wherein the first circuit is further configured to determine obstacle avoidance data based on the optical sensor data; and
a second circuit configured to receive image data from a camera mounted in the camera holder, wherein the second circuit is further configured to determine camera holder control data to control movement of the camera holder based on the image data.

20. The unmanned aerial vehicle of claim 19,
wherein the first circuit is further configured to determine obstacle avoidance data based on the optical and non-optical sensor data.

* * * * *